March 4, 1952           H. L. FRICK           2,587,831
BRAKE ADJUSTING MECHANISM
Original Filed Feb. 27, 1946
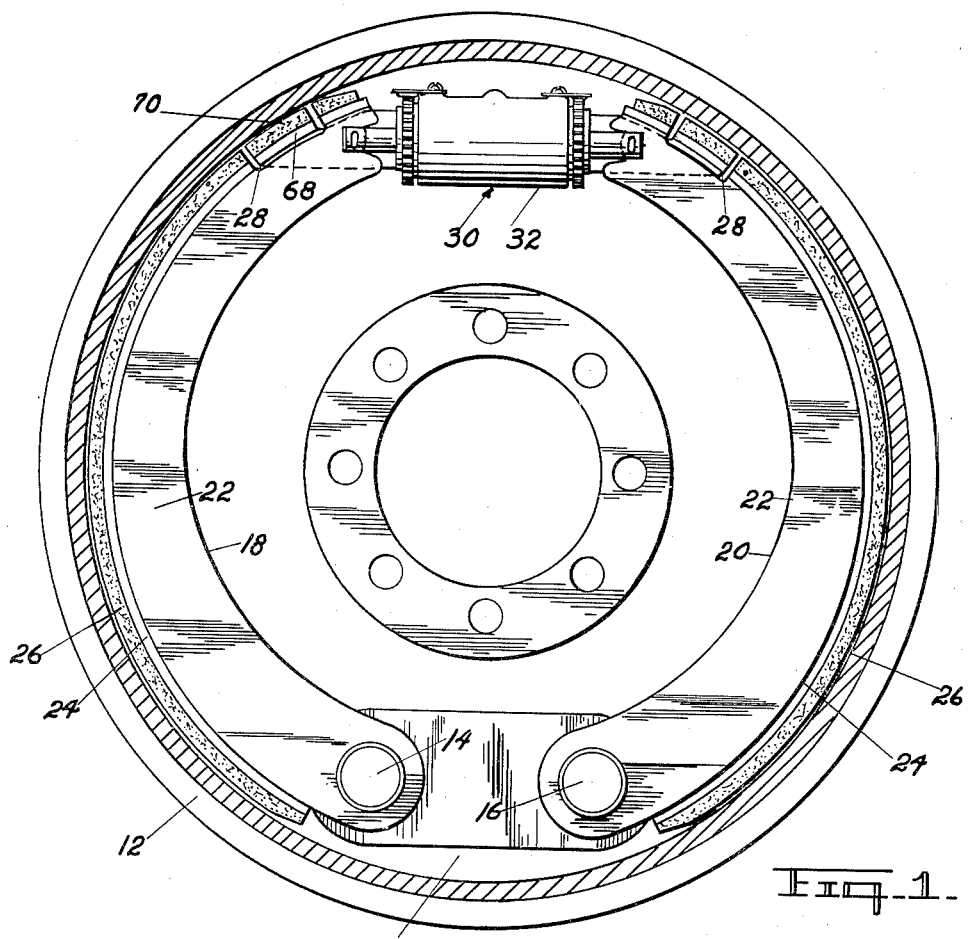
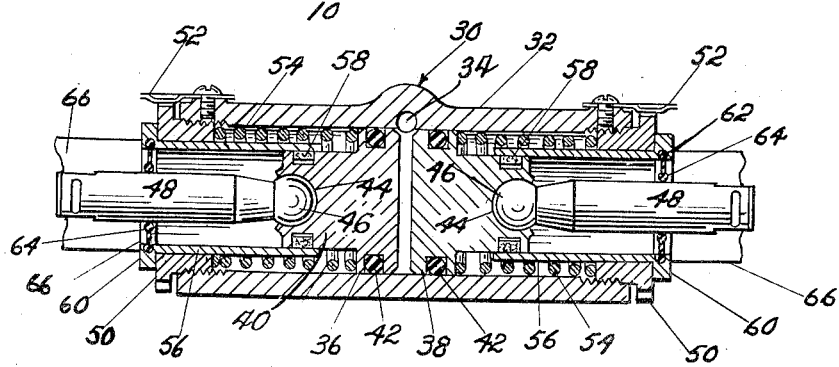
INVENTOR
HAROLD L. FRICK
BY
ATTORNEY Patented Mar. 4, 1952

2,587,831

UNITED STATES PATENT OFFICE 2,587,831

BRAKE ADJUSTING MECHANISM

Harold L. Frick, Detroit, Mich., assignor to Hydraulic Brake Company, a corporation of California Substituted for abandoned application Serial No. 650,406, February 27, 1946. This application May 10, 1950, Serial No. 161,201

5 Claims. (Cl. 188—79.5)

This application is a substitute for my abandoned application, Serial Number 650,406, filed February 27, 1946.

This invention relates to brakes and more particularly to brakes for motor vehicles.

Broadly the invention comprehends a brake for a motor vehicle, having all of the essentials for actuation and automatic adjustment thereof embodied in a single unit.

Another object of the invention is to provide a brake for a motor vehicle in which actuating means for friction elements, retractable means for the friction elements and automatic adjustment means for the friction elements are embodied in a single unit for complete control of the brake.

Another object of the invention is to provide a brake for a motor vehicle having automatically operative adjusters for the friction elements thereof carried by actuating means for the brake.

Another object of the invention is to provide a fluid pressure actuated brake for motor vehicles having automatically operative adjusters for the friction element thereof clamped to the actuator and controlled as a result of wear on the friction element during a normal braking operation.

Other objects and advantages of the invention will hereinafter appear from the following description when taken in connection with the accompanying drawings forming a part of this specification, and in which:

Figure 1 is a vertical sectional view of a brake embodying the invention, and

Figure 2 is an enlarged longitudinal sectional view of a fluid pressure actuated motor and associated elements.

Referring to the drawings for more specific details of the invention, 10 represents a fixed support or a backing plate adapted to be secured to an axle or to an axle housing, and associated with the backing plate is a rotatable drum 12 adapted to be secured to a wheel.

The backing plate has arranged thereon spaced anchors 14 and 16 and a pair of corresponding interchangeable friction elements or shoes 18 and 20 having their articulate ends pivoted on the anchors.

Each of the shoes includes a web 22 supporting a rim 24 having suitably secured thereon a friction lining 26, and adjacent the toe of the shoe, the web, the rim and the lining are cut away as at 28, the object of which will hereinafter appear.

A fluid pressure actuated motor indicated generally at 30, is fixedly secured on the backing plate 10 between the toes or force applying ends of the shoes 18 and 20. The motor includes a cylinder 32 having a port 34 preferably centrally with respect to the length of the cylinder.

The cylinder 32 has therein corresponding oppositely disposed pistons 36 and 38. Each of the pistons has a reduced body portion 40 and a head complementary to the bore of the cylinder having a circumferential groove for the reception of a sealing ring 42 suitable for inhibiting seepage of fluid past the piston. The reduced body portion 40 has a socket 44 for the reception of a ball 46 on one end of a thrust pin 48. The ball is secured against displacement as by turning the rim of the wall defining the socket, and the other end of the thrust pin is suitably connected to the force applying end of the adjacent shoe.

A manually adjustable stop ring 50 for initially setting the brake is threaded in each end of the cylinder and held against displacement as by spring clips 52 mounted on the cylinder, and retractile springs 54 interposed between the stop rings 50 and the pistons serve to return the pistons and, accordingly, the shoes to the retracted position.

Automatically operative adjusters for the friction elements or shoes include sleeves 56 supported for reciprocation in the stop rings 50 and on the body portions 40 of the pistons. The sleeves are frictionally gripped on the pistons as by spring pressed split friction rings 58 fitted in circumferential grooves in the body portions of the pistons. The sleeves have flanges constituting stops 60 for cooperation with the stops 50, and internal grooves 62 supporting dust shields 64 embracing the thrust pins for the exclusion of dust and other foreign matter from the cylinder.

Corresponding oppositely disposed arms 66 formed integral with or suitably secured to the sleeves 56 straddle the webs of the shoes and support rim sections 68 in the cut away portions 28 of the shoes and a friction block 70, preferably of a lower coefficient of friction than that of the linings of the shoes, is suitably secured to the rim sections.

In a normal operation fluid under pressure entering the cylinder 32 by way of the ports 34 results in moving the pistons 36 and 38 in opposite directions. During this movement of the pistons force is transmitted from the pistons through the thrust pins 48 to the force applying ends of the friction elements or shoes 18 and 20, resulting in movement of the shoes into engagement with the drum 12 against the resistance of the retractile springs 54 to effectively retard rotation of the drum.

During this operation the sleeves 56 frictionally clamped to the pistons 36 and 38 by the friction elements 58 are moved outwardly from the cylinder in opposite directions and transmit force through the arms 66 to the shoe segment 68 to yieldingly apply the friction blocks 70 to the drum.

A braking operation, such as above described, inherently results in wear of the friction linings 26 on the friction elements or shoes, and since these friction linings are of a higher coefficient of friction than the friction block 70 on the rim sections 68 of the adjusters, there is a differential in wear resulting in relative movement between the friction elements and the friction blocks 70 and this movement, which may be in increments, is transmitted through the arms 66 to the sleeves 56 resulting in moving the sleeves inwardly of the cylinder on the pistons 36 and 38 against the resistance of the friction elements 58 proportionately to the differential of wear of the linings 26 and the friction blocks 70, and this establishes an adjusted relationship between the stop rings 50 and the stops 60 on the sleeves 56.

Under this condition, upon the conclusion of a braking operation and release of pressure on the fluid in the cylinder of the motor 30, the pistons 36 and 38 are returned to their retracted positions under the influence of the retractile springs 54 and this movement of the pistons results in moving the friction elements or shoes to their retracted positions in proper spaced relation to the drum.

While this invention has been described in connection with certain specific embodiments, the principle involved is susceptible of numerous other applications, that will readily occur to persons skilled in the art.

Having thus described the various features of the invention, what I claim as new and desire to secure by Letters Patent is:

1. A brake comprising a rotatable drum, friction elements for cooperation therewith, a motor including a cylinder and opposed pistons for actuating the friction elements, manually adjustable stops on the cylinder, stops frictionally clamped to the pistons for cooperation with the manually adjustable stops, and means yieldably and slidably engaging the drum for adjusting the stops on the pistons.

2. A brake comprising a rotatable drum, friction elements for cooperation therewith, a motor including a cylinder and opposed pistons movable therein for actuating the friction elements, manually adjustable stops on the cylinder, retractile springs in the cylinder between the stops and the pistons, stops frictionally clamped to the pistons for cooperation with the manually adjustable stops and means cooperating with the drum for adjusting the stops on the pistons as a result of wear on the friction elements.

3. A brake comprising a rotatable drum, friction elements for cooperation therewith, a motor including a cylinder and a piston movable therein for actuating the friction elements, manually adjustable stops on the cylinder, retractile springs for the pistons, friction elements in the cylinder between the stops and the pistons, sleeves frictionally clamped to the pistons, stops on the sleeves for cooperation with the stops on the cylinder, and wear resisting blocks connected to the sleeves and cooperating with the drum for determining the relationship of the stops.

4. A brake comprising a rotatable drum, friction elements for cooperation therewith, a motor including a cylinder and opposed pistons for actuating the friction elements, manually adjustable stops on the cylinder, means in the cylinder for retracting the friction elements, stops frictionally clamped to the pistons for cooperation with the manually adjustable stops, and means cooperating with the drum for adjusting the stops on the pistons.

5. A brake comprising a rotatable drum, friction elements for cooperation therewith, a motor including a cylinder and opposed pistons reciprocable in the cylinder for actuation of the friction elements, manually adjustable stops on the cylinders, springs interposed between the pistons and the stops for retracting the pistons, stops frictionally engaging the pistons and cooperating with the manually adjustable stops and with the drum for adjustment thereof on the pistons.

HAROLD L. FRICK.

REFERENCES CITED

The following references are of record in the file of this patent:

UNITED STATES PATENTS

| Number | Name | Date |
|---|---|---|
| 2,175,446 | Rasmussen et al. | Oct. 10, 1939 |
| 2,242,685 | Swift | May 20, 1941 |
| 2,497,815 | Frick | Feb. 14, 1950 |